United States Patent
Yoon et al.

(10) Patent No.: US 12,426,035 B2
(45) Date of Patent: Sep. 23, 2025

(54) METHOD AND DEVICE FOR CONFIGURING CONTROL INFORMATION IN WIRELESS COMMUNICATION SYSTEM

(71) Applicant: SAMSUNG ELECTRONICS CO., LTD., Suwon-si (KR)

(72) Inventors: Suha Yoon, Suwon-si (KR); Taehyoung Kim, Suwon-si (KR); Seho Myung, Suwon-si (KR); Jeongho Yeo, Suwon-si (KR); Euichang Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 384 days.

(21) Appl. No.: 17/975,230

(22) Filed: Oct. 27, 2022

(65) Prior Publication Data

US 2023/0080720 A1    Mar. 16, 2023

Related U.S. Application Data

(63) Continuation of application No. PCT/KR2021/005251, filed on Apr. 26, 2021.

(30) Foreign Application Priority Data

Apr. 27, 2020 (KR) .................. 10-2020-0051045

(51) Int. Cl.
*H04W 72/1263* (2023.01)
*H04W 72/23* (2023.01)

(52) U.S. Cl.
CPC ....... *H04W 72/1263* (2013.01); *H04W 72/23* (2023.01)

(58) Field of Classification Search
None
See application file for complete search history.

(56) References Cited

U.S. PATENT DOCUMENTS 8,625,558 B2   1/2014   Lin
8,687,579 B2   4/2014   Wu et al.
(Continued)

FOREIGN PATENT DOCUMENTS

EP   2 763 338 A1   8/2014
EP   2 525 597 B1   8/2015
(Continued)

OTHER PUBLICATIONS

International Search Report dated Jul. 29, 2021 issued by the International Searching Authority in counterpart International Application No. PCT/KR2021/005251 (PCT/ISA/210).
(Continued)

*Primary Examiner* — Christopher T Wyllie
(74) *Attorney, Agent, or Firm* — Sughrue Mion, PLLC

(57) ABSTRACT

Methods and apparatuses for performing wireless communication are provided. In some embodiments, a method performed by a terminal of a wireless communication system, includes receiving, from a base station of the wireless communication system, cross-carrier scheduling configuration information; identifying whether the cross-carrier scheduling configuration information for a secondary cell (SCell) comprises a carrier indicator field (CIF) presence field; receiving, from the base station, downlink control information for another cell on the SCell based on identifying that the cross-carrier scheduling configuration information comprises the CIF presence field; and receiving, from the base station, data using the another cell according to the downlink control information, wherein the cross-carrier scheduling configuration information indicates a CIF value of the SCell when the CIF presence field is configured for two or more cells.

16 Claims, 10 Drawing Sheets

(56) References Cited

U.S. PATENT DOCUMENTS

| | | | |
|---|---|---|---|
| 9,148,272 | B2 | 9/2015 | Yang et al. |
| 9,258,814 | B2 | 2/2016 | Prakash et al. |
| 9,345,018 | B2 | 5/2016 | Earnshaw et al. |
| 9,420,609 | B2 | 8/2016 | Abe et al. |
| 9,843,420 | B2 | 12/2017 | Kim et al. |
| 9,999,070 | B2 | 6/2018 | Yan et al. |
| 10,728,800 | B2 | 7/2020 | Suzuki et al. |
| 2012/0300715 | A1* | 11/2012 | Pelletier ............ H04W 74/0833 370/329 |
| 2012/0307778 | A1 | 12/2012 | Nishio et al. |
| 2013/0136006 | A1* | 5/2013 | Kim ................. H04L 5/0098 370/329 |
| 2014/0029565 | A1* | 1/2014 | Kim .................. H04W 72/23 370/329 |
| 2014/0192757 | A1 | 7/2014 | Lee et al. |
| 2015/0180623 | A1* | 6/2015 | Kim .................. H04L 5/001 370/336 |
| 2016/0295600 | A1 | 10/2016 | Dinan |
| 2017/0135127 | A1* | 5/2017 | Nogami ............. H04W 72/23 |
| 2017/0251461 | A1* | 8/2017 | Parkvall ............ H04L 5/0053 |
| 2017/0303304 | A1 | 10/2017 | Lee et al. |
| 2017/0374653 | A1* | 12/2017 | Lee .................. H04L 1/00 |
| 2020/0029356 | A1 | 1/2020 | Choi et al. |
| 2020/0100262 | A1 | 3/2020 | Dinan |
| 2021/0037551 | A1* | 2/2021 | Khoshnevisan ...... H04L 5/0044 |
| 2021/0274535 | A1* | 9/2021 | Yi ................... H04W 72/0446 |
| 2021/0329677 | A1* | 10/2021 | Huang ............... H04W 24/08 |
| 2021/0360674 | A1* | 11/2021 | Lim ................. H04W 52/0216 |
| 2022/0039142 | A1* | 2/2022 | Li ................... H04L 5/0053 |
| 2022/0150929 | A1* | 5/2022 | Matsumura ........ H04L 5/0044 |
| 2022/0330314 | A1* | 10/2022 | Takeda .............. H04W 72/23 |

FOREIGN PATENT DOCUMENTS

| | | | | | |
|---|---|---|---|---|---|
| EP | 3 089 530 | A1 | | 11/2016 | |
| JP | 5766834 | B2 | | 8/2015 | |
| JP | 2017-92508 | A | | 5/2017 | |
| JP | 2019-4195 | A | | 1/2019 | |
| KR | 20140040445 | A | * | 4/2014 | ............. H04J 11/00 |
| KR | 10-2016-0019972 | A | | 2/2016 | |
| KR | 10-1814359 | B1 | | 1/2018 | |
| WO | 2019/139976 | A1 | | 7/2019 | |

OTHER PUBLICATIONS

International Written Opinion dated Jul. 29, 2021 issued by the International Searching Authority in counterpart International Application No. PCT/KR2021/005251 (PCT/ISA/237).
Ericsson et al., "Introduction of DL RRC segmentation", R2-2002161, Current version: 15.8.0, 3GPP TSG-RAN2 Meeting #109, Mar. 11, 2020, 541 pages total.
Ericsson, "New WID on NR Dynamic spectrum sharing (DSS)", RP-193260, 3GPP TSG RAN Meeting #86, Dec. 12, 2019, 4 pages total.
"3rd Generation Partnership Project; Technical Specification Group Radio Access Network; NR; Physical layer procedures for control (Release 15)", Technical Specification, 3GPP TS 38.213 V15.9.0, 3GPP, Apr. 3, 2020, 109 pages total.
"3rd Generation Partnership Project; Technical Specification Group Radio Access Network; NR; Radio Resource Control (RRC) protocol specification (Release 15)", Technical Specification, 3GPP Ts 38.331 V15.9.0, 3GPP, Mar. 31, 2020, 536 pages total.
Communication dated Jul. 13, 2023, issued by European Patent Office in European Patent Application No. 21795978.2.
Communication dated May 30, 2025 issued by the Korean Intellectual Property Office in Korean Patent Application No. 10-2020-0051045.
CATT, "Correction on CrossCarrierSchedulingConfig", 3GPP TSG-RAN WG2 Meeting #106, May 1, 2019, R2-1905863 (3 pages total).
Huawei et al., "Remaining CP issues for B5C", 3GPP TSG RAN WG2 Meeting #91, Aug. 15, 2015, R2-153361 (4 pages total).

\* cited by examiner

Cross carrier scheduling only from
one component carrier

Cross carrier scheduling from two
component carrier

FIG. 5

|  | UE 1 | UE 2 |
|---|---|---|
| DSS Carrier | Primary Cell | Primary Cell |
| NR Carrier$_1$ | Secondary Cell$_1$, cif-Presence=true | Secondary Cell$_1$, cif-Presence=true |
| NR Carrier$_2$ | Secondary Cell$_2$ | Secondary Cell$_2$, cif-Presence=true |

| | UE 1 | UE 2 |
|---|---|---|
| DSS Carrier | Primary Cell | Primary Cell |
| NR Carrier$_1$ | Secondary Cell$_1$, cif-Presence=true cif-InSchedulingCell=cif$_{N1}$ | Secondary Cell$_1$, cif-Presence=true cif-InSchedulingCell=cif$_{N2}$ |
| NR Carrier$_2$ | Secondary Cell$_2$ | Secondary Cell$_2$, cif-Presence=true cif-InSchedulingCell=cif$_{N1}$ |

METHOD AND DEVICE FOR CONFIGURING CONTROL INFORMATION IN WIRELESS COMMUNICATION SYSTEM

CROSS-REFERENCE TO RELATED APPLICATIONS

This application is a continuation application of International Application No. PCT/KR2021/005251, filed on Apr. 26, 2021, which claims priority to Korean Patent Application 10-2020-0051045, filed on Apr. 27, 2020, in the Korean Intellectual Property Office, the disclosures of which are incorporated by reference herein in their entireties.

BACKGROUND

1. Field

The disclosure relates to a mobile communication system, more particularly, to dynamic spectrum sharing (DSS).

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands (e.g., 60 GHz bands) so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, and large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency-shift keying (FSK) and frequency quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The internet, which may refer to a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and the like have been recently researched. Such an IoT environment may provide intelligent internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

As the number of terminals in the network increases, a scheduling capacity may be insufficient, and a method for solving this is required.

SUMMARY

Provided is a method for scheduling a physical downlink shared channel (PDSCH) or physical uplink shared channel (PUSCH) for a primary cell (PCell) or a primary secondary cell (PSCell) using control information transmitted through a physical downlink control channel (PDCCH) of a secondary cell (SCell) in a wireless communication system.

According to an aspect of the disclosure, a method of performing wireless communication by a terminal of a wireless communication system is provided. The method includes receiving, from a base station of the wireless communication system, cross-carrier scheduling configuration information; identifying whether the cross-carrier scheduling configuration information for a secondary cell (SCell) comprises a carrier indicator field (CIF) presence field; receiving, from the base station, downlink control information for another cell on the SCell based on identifying that the cross-carrier scheduling configuration information comprises the CIF presence field; and receiving, from the base station, data using the another cell according to the downlink control information, wherein the cross-carrier scheduling configuration information indicates a CIF value of the SCell when the CIF presence field is configured for two or more cells.

The receiving of the data may include receiving the data using a cell indicated by a downlink CIF value comprised by the downlink control information.

The method may further include configuring a CIF value of a primary cell (PCell) with a predetermined value when the cross-carrier scheduling configuration information for the PCell is not received.

The method may further include determining a CIF value of a PCell based on a predetermined rule when the cross-carrier scheduling configuration information for the PCell is not received.

According to an aspect of the disclosure, a method of performing wireless communication by a base station of a wireless communication system is provided. The method includes transmitting, to a terminal of the wireless communication system, cross-carrier scheduling configuration information; transmitting, to the terminal, downlink control information for another cell on an SCell based on the cross-carrier scheduling configuration information for the SCell comprising a CIF presence field; and transmitting, to the terminal, data using the another cell according to the downlink control information, wherein the cross-carrier scheduling configuration information indicates a CIF value of the SCell when the CIF presence field is configured for two or more cells.

The transmitting of the data may include transmitting, to the terminal, the data using a cell indicated by a downlink CIF value comprised by the downlink control information.

The method may further include configuring a CIF value of a PCell with a predetermined value when cross-carrier scheduling for the PCell is not configured.

The method may further include determining a CIF value of a PCell based on a predetermined rule when cross-carrier scheduling for the PCell is not configured.

According to an aspect of the disclosure, a terminal of a wireless communication system includes a transceiver, a memory storing one or more instructions, and a processor communicatively coupled to the transceiver and the memory. The processor is configured to execute the one or more instructions stored in the memory to receive, via the transceiver from a base station of the wireless communication system, cross-carrier scheduling configuration information, identify whether the cross-carrier scheduling configuration information for a SCell comprises a CIF presence field, receive, from the base station via the transceiver, downlink control information of another cell on the SCell based on an identification that the cross-carrier scheduling configuration information comprises the CIF presence field, and receive, from the base station via the transceiver, data using the another cell according to the downlink control information, wherein the cross-carrier scheduling configuration information indicates a CIF value of the SCell when the CIF presence field is configured for two or more cells.

The processor may be further configured to receive, from the base station via the transceiver, the data using a cell indicated by a downlink CIF value comprised by the downlink control information.

The processor may be further configured to configure a CIF value of a PCell with a predetermined value when the cross-carrier scheduling configuration information for the PCell is not received.

The processor may be further configured to determine a CIF value of a PCell based on a predetermined rule when the cross-carrier scheduling configuration information for the PCell is not received.

According to an aspect of the disclosure, a base station of a wireless communication system includes a transceiver, a memory storing one or more instructions, and a processor communicatively coupled to the transceiver and the memory. The processor is configured to execute the one or more instructions stored in the memory to transmit, via the transceiver to a terminal of the wireless communication system, cross-carrier scheduling configuration information, transmit, via the transceiver to the terminal, downlink control information for another cell on a SCell based on the cross-carrier scheduling configuration information for the SCell comprising a CIF presence field, and transmit, via the transceiver to the terminal, data using the another cell according to the downlink control information, wherein the cross-carrier scheduling configuration information indicates a CIF value of the SCell when the CIF presence field is configured for two or more cells.

The processor may be further configured to transmit, to the terminal via the transceiver, the data using a cell indicated by a downlink CIF value comprised by the downlink control information.

The processor may be further configured to configure a CIF value of a PCell with a predetermined value when cross-carrier scheduling for the PCell is not configured.

The processor may be further configured to determine a CIF value of a PCell based on a predetermined rule when cross-carrier scheduling for the PCell is not configured.

According to one or more embodiments of the disclosure, there is provided a method for scheduling a PDSCH or PUSCH of a PCell or a PSCell through a PDCCH of an SCell in a wireless communication system so that it is possible to perform scheduling for terminals by efficiently using radio resources.

BRIEF DESCRIPTION OF THE DRAWINGS

The above and other aspects, features, and advantages of certain embodiments of the present disclosure will be more apparent from the following description taken in conjunction with the accompanying drawings.

FIG. 5 illustrates a method for performing cross-carrier scheduling through a secondary cell (SCell), according to an embodiment of the disclosure;

FIG. 6 illustrates a method for configuring a carrier indicator field (CIF) value of a scheduling cell, according to an embodiment of the disclosure;

DETAILED DESCRIPTION

Figure 1:
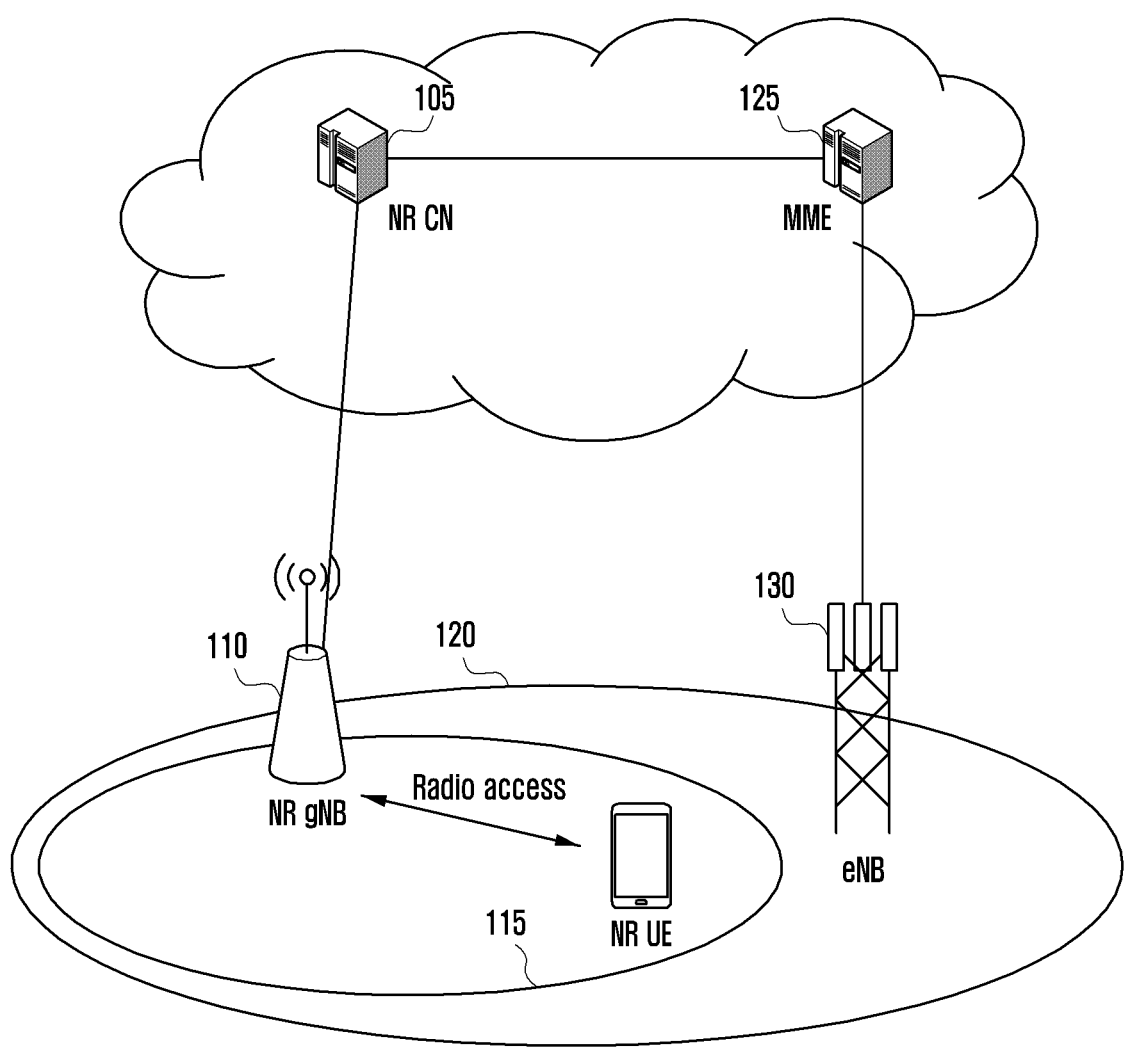
FIG. 1 illustrates a structure of a next-generation mobile communication system, according to an embodiment of the disclosure.

Hereinafter, embodiments of the disclosure will be described in detail with reference to the accompanying drawings.

In describing embodiments, descriptions of technical contents that are well known in the technical field to which the disclosure pertains and are not directly related to the disclosure will be omitted. This is to more clearly convey the gist of the disclosure by omitting unnecessary description.

For the same reason, in the accompanying drawings, some elements are enlarged, omitted, or depicted schematically. Furthermore, the size of each element does not accurately reflect its real size. In the drawings, the same or similar elements are assigned the same reference numerals.

The merits and characteristics of the disclosure and a method for achieving the merits and characteristics will become more apparent from the embodiments described in detail in conjunction with the accompanying drawings. However, the disclosure is not limited to the disclosed embodiments, but may be implemented in various different ways. The embodiments of the present disclosure are provided to only complete the present disclosure and to allow those skilled in the art to understand the category of the disclosure. The present disclosure is defined by the category of the claims. The same reference numerals will be used to refer to the same or similar elements throughout the drawings.

In this case, it will be understood that each block of the flowchart illustrations and combinations of the flowchart illustrations can be executed by computer program instructions. These computer program instructions may be mounted on the processor of a general purpose computer, a special purpose computer, or other programmable data processing apparatus, so that the instructions executed by the processor of the computer or other programmable data processing apparatus create means for executing the functions specified in the flowchart blocks. These computer program instructions may also be stored in computer-usable or computer-readable memory that can direct a computer or other programmable data processing equipment to function in a particular manner, so that the instructions stored in the computer-usable or computer-readable memory produce an article of manufacture including instruction means that implement the function specified in the flowchart blocks. The computer program instructions may also be loaded into a computer or other programmable data processing apparatus to cause a series of operational steps performed on the computer or other programmable data processing apparatus to produce a computer-executed process, so that the instructions performing the computer or other programmable data processing apparatus provide the steps for executing the functions described in the flowchart blocks.

Furthermore, each block may represent a portion of a module, a segment, or code, which includes one or more executable instructions for implementing a specified logical functions. It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

In this case, the term "unit", as used in the present embodiment means software or a hardware component, such as a field programmable gate array (FPGA) or an application-specific integrated circuit (ASIC), and the "unit" performs specific tasks. However, the 'unit' is not limited to software or hardware. The "unit" may be constituted to reside on an addressable storage medium and constituted to operate on one or more processors. Accordingly, according to some embodiments, the "unit" may include components such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate one or more CPUs within a device or a security multimedia card. Alternatively or additionally, according to some embodiments, the 'unit' may include one or more processors.

Hereinafter, the operating principles of the disclosure are described in detail with reference to the accompanying drawings. In describing the disclosure below, a detailed description of a related known function or configuration will be omitted if it is deemed to make the gist of the present disclosure unnecessarily vague. Furthermore, terms to be described hereunder have been defined by taking into consideration functions in the disclosure, and may be different depending on a user, an operator's intention or practice. Accordingly, each term should be defined based on contents over the entire specification. Hereinafter, a base station is the subject of resource allocation to a terminal, and may be at least one of an gNode B (gNB), an eNode B (eNB), a Node B (NB), a base station (BS), a radio access unit, a BS controller and a node in a network. A terminal may include a user equipment (UE), a mobile station (MS), a cellular phone, a smartphone, a computer and a multimedia system capable of performing a communication function. The present disclosure is not limited to the above example. Hereinafter, the present disclosure describes a technology for a terminal to receive broadcast information from a base station in a wireless communication system. The present disclosure relates to a communication technique which combines a 5th generation (5G) communication system, for supporting a higher data rate following 4th Generation (4G) systems, with Internet of Things (IoT) technology, and to a system for the communication techniques. The present disclosure may be applied to intelligent services (for example, smart homes, smart buildings, smart cities, smart cars or connected cars, health care, digital education, retail business, security, and safety-related services), on the basis of 5G communication technology and IoT-related technology.

Terms referring to broadcast information, terms referring to control information, terms related to communication coverage, terms (e.g., an event) referring to a state change, terms referring to network entities, terms referring to messages, terms referring to components of a device, and the like which are used in the following description are illustrated for convenience of description. Therefore, the present disclosure is not limited to the following terms, and other terms having equivalent technical meanings can be used.

For convenience of description, some of terms and names defined in the 3rd generation partnership project long term evolution (3GPP LTE) standard may be used. However, the disclosure is not limited by the above-mentioned terms and names, and can be equally applied to systems conforming to other standards.

FIG. 1 illustrates a structure of a next-generation mobile communication system according to an embodiment of the disclosure.

With reference to FIG. 1, a radio access network of a next-generation mobile communication system (hereinafter, NR or 5G) may be constituted with a next-generation base station (new radio node B, hereinafter NR gNB or NR base station) 110 and a new radio core network (NR CN) 105. A new radio user equipment (NR UE or terminal) 115 may access an external network through the NR gNB 110 and the NR CN 105.

In FIG. 1, the NR gNB 110 may correspond to an Evolved Node B (eNB) of an existing LTE system. The NR gNB 110 is connected to the NR UE 115 through a radio channel, and can provide a service superior to that of the existing Node B. In the next-generation mobile communication system, all user traffic may be serviced through a shared channel. Therefore, an apparatus for scheduling by collecting status information such as buffer status, available transmission power status, and channel status of UEs may be required, and the NR NB 110 may be configured to provide such functionality. One NR gNB 110 can control multiple cells. In the next-generation mobile communication system, a bandwidth greater than or equal to a current maximum bandwidth may be applied to implement super speed data transmission compared to current LTE. Alternatively or additionally, a beamforming technology may be additionally combined by using orthogonal frequency division multiplexing (OFDM) as a radio access technology. Alternatively or additionally, an adaptive modulation & coding (AMC) scheme for determining a modulation scheme and a channel coding rate according to the channel state of the terminal may be applied.

The NR CN 105 may perform functions such as mobility support, bearer configuration, and QoS configuration. The NR CN 105 is a device that performs various control functions, as well as a mobility management function for a terminal, and may be connected to a plurality of base stations. Alternatively or additionally, the next-generation mobile communication system may be interlocked with the existing LTE system, and the NR CN 105 may be connected to the MME 125 through a network interface. The MME may be connected to an eNB 130, which is an existing base station.

Figure 2:
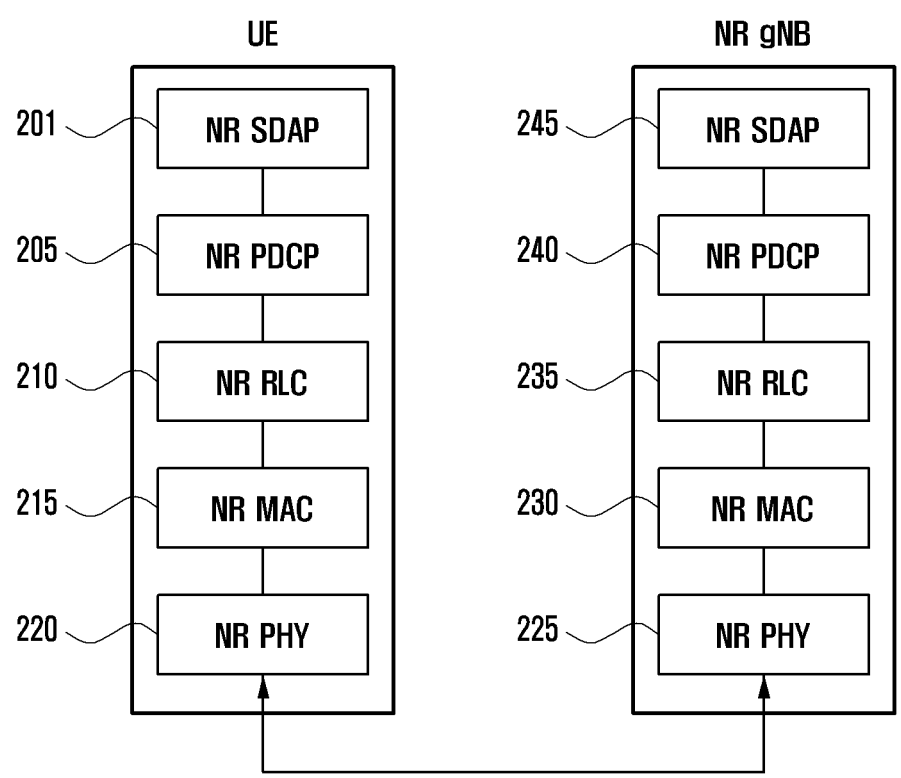
FIG. 2 illustrates a radio protocol structure of a next-generation mobile communication system, according to an embodiment of the disclosure.

FIG. 2 illustrates a radio protocol structure of a next-generation mobile communication system according to an embodiment of the disclosure.

With reference to FIG. 2, the radio protocol of the next-generation mobile communication system includes NR service data adaptation protocol (SDAP) 201, 245, NR PDCP 205, 240, NR RLC 210, 235, NR MAC 215, 230, and NR PHY 220, 225 in a terminal and a base station, respectively.

The primary functions of the NR SDAP 201, 245 may include some of the following functions: a transfer function of user data (e.g., transfer of user plane data), a mapping function between QoS flow and data bearer for an uplink and a downlink (e.g., mapping between a QoS flow and a DRB for both DL and UL), a marking function of QoS flow ID in an uplink and a downlink (e.g., marking QoS flow ID in both DL and UL packets), and a mapping function of reflective QoS flow to data bearer for upper link SDAP PDUs (e.g., reflective QoS flow to DRB mapping for UL SDAP PDUs).

With regard to an SDAP layer entity, the terminal may receive a configuration indicating whether or not to use a header of the SDAP layer entity or whether or not to use functions of the SDAP layer entity for each PDCP layer entity, for each bearer, or for each logical channel through a radio resource control (RRC) message. In the case where the SDAP header is configured, a 1-bit non-access stratum (NAS) reflective quality-of-service (QOS) configuration indicator and 1-bit access stratum (AS) reflective QoS configuration indicator of the SDAP header may instruct the terminal to update or reconfigure mapping information between the QoS flow and the data bearers in uplink and downlink. The SDAP header may include QoS flow ID information indicating the QoS. The QoS information may be used as data processing priority, scheduling information, and the like in order to support effective services.

The primary functions of the NR PDCP 205, 240 may include some of the following functions: a function of header compression and decompression (e.g., ROHC only), a transfer function of user data, an in-sequence delivery function (e.g., in-sequence delivery of upper layer PDUs), an out-of-sequence delivery function (e.g., out-of-sequence delivery of upper layer PDUs), a reordering function (e.g., PDCP PDU reordering for reception), a duplicate detection function (e.g., duplicate detection of lower layer SDUs), a retransmission function (e.g., retransmission of PDCP SDUs), ciphering and deciphering functions, and a timer-based SDU discard function (e.g., timer-based SDU discard in uplink).

The above reordering function of the NR PDCP entity may denote a function of reordering PDCP PDUs received from a lower layer, based on a PDCP sequence number (SN). The reordering function of the NR PDCP entity may include a function of transmitting data to a higher layer in the reordered order, may include a function of directly transmitting data to the higher upper layer without consideration of the order thereof, may include a function of reordering the sequence and recording lost PDCP PDUs, may include a function of sending a status report of the lost PDCP PDUs to a transmitting end, and may include a function of making a request for retransmission of the lost PDCP PDUs.

The primary functions of the NR RLC 210, 235 may include some of the following functions: a data transfer function (e.g., transfer of upper layer PDUs), an in-sequence delivery function (e.g., in-sequence delivery of upper layer PDUs), an out-of-sequence delivery function (e.g., out-of-sequence delivery of upper layer PDUs), an ARQ function (e.g., error correction through ARQ), concatenation, segmentation and reassembly functions (e.g., concatenation, segmentation and reassembly of RLC SDUs), a re-segmentation function (e.g., re-segmentation of RLC data PDUs), a reordering function (e.g., reordering of RLC data PDUs), a duplicate detection function, an error detection function (e.g., protocol error detection), an RLC SDU discard function, and an RLC re-establishment function In the above description, the in-sequence delivery function of the NR RLC entity may denote a function of transferring RLC SDUs received from a lower layer to a higher layer in sequence. The in-sequence delivery function of the NR RLC entity may include a function of, if one original RLC SDU is divided into a plurality of RLC SDUs and received, reassembling and transmitting the same.

The in-sequence delivery function of the NR RLC entity may include a function of reordering the received RLC PDUs, based on an RLC sequence number (SN) or a PDCP sequence number (SN), may include a function of reordering the sequence and recording lost RLC PDUs, may include a function of sending a status report of the lost RLC PDUs to a transmitting end, and may include a function of making a request for retransmission of the lost RLC PDUs.

The in-sequence delivery function of the NR RLC 210, 235 entity may include a function of, if there is a lost RLC SDU, transmitting only the RLC SDUs prior to the lost RLC SDU to a higher layer in sequence. Alternatively or additionally, the in-sequence delivery function of the NR RLC entity may include a function of, if a predetermined timer expires even though there is a lost RLC SDU, transmitting all RLC SDUs received before the timer starts to the higher layer in sequence. Alternatively or additionally, the in-sequence delivery function of the NR RLC entity may include a function of, if a predetermined timer expires even though there is a lost RLC SDU, transmitting all RLC SDUs received until the present to the higher layer in sequence.

The NR RLC 210, 235 entity may process the RLC PDUs in the order of reception, regardless of a serial number (out-of-sequence delivery), and may transmit the same to the NR PDCP 205, 240 entity.

In the case of receiving segments, the NR RLC 210, 235 entity may receive the segments, which are stored in a buffer or will be received later, may reconstitute the same into one complete RLC PDU, and may transmit the complete RLC PDU to the NR PDCP entity.

The NR RLC layer may not include a concatenation function, which may be performed in the NR MAC layer or may be replaced with a multiplexing function of the NR MAC layer.

In the above description, the out-of-sequence delivery of the NR RLC entity may denote a function of directly delivering RLC SDUs received from a lower layer to a higher layer regardless of the sequence thereof. The out-of-sequence delivery of the NR RLC entity may include a function of, if one original RLC SDU is divided into a plurality of RLC SDUs and is received, reassembling and delivering the same. The out-of-sequence delivery of the NR RLC entity may include a function of storing and ordering RLC SNs or PDCP SNs of the received RLC PDUs, thereby recording the lost RLC PDUs.

The NR MAC 215, 230 may be connected to a plurality of NR RLC layer entities constituted in a single terminal, and the primary functions of the NR MAC may include some of the following functions: a mapping function (e.g., mapping between logical channels and transport channels), multiplexing and demultiplexing functions (e.g., multiplexing/demultiplexing of MAC SDUs), a scheduling information reporting function, a HARQ function (e.g., error correction through HARQ), a priority handling function between logical channels (e.g., priority handling between logical channels of one UE), a priority handling function between UEs (e.g., priority handling between UEs by means of dynamic scheduling), a MBMS service identification function, a transport format selection function, and a padding function The NR PHY layer 220, 225 may perform operations of channel-coding and modulating the higher layer data into an OFDM symbol and transmitting the same through a radio channel, or operations of demodulating and channel-decoding the OFDM symbol received through the radio channel and transmitting the same to the higher layer.

Figure 3:
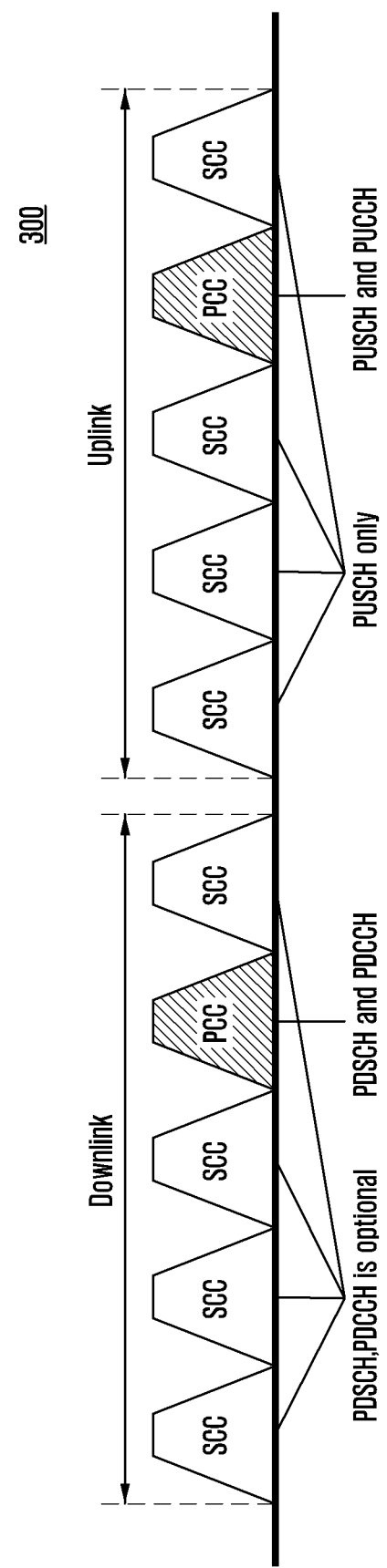
FIG. 3 illustrates a diagram for describing carrier aggregation (CA), according to an embodiment of the disclosure.

FIG. 3 illustrates a diagram for describing carrier aggregation (CA) according to an embodiment of the disclosure.

With reference to FIG. 3, when CA is configured (300), PCell and SCell may be configured in the terminal.

The PCell is included in a primary component carrier (PCC), and may provide functions of RRC connection establishment/re-establishment, measurement, mobility procedure, random access procedure and selection, system information acquisition, initial random access, security key change and Non-Access Stratum (NAS), and the like.

Since the terminal performs system information monitoring through the PCell, the PCell is not deactivated, and the PCC in the UL is delivered through the PUCCH for transmission of control information. Alternatively or additionally, only one RRC connection may be possible between the terminal and the PCell, and PDCCH/PDSCH/PUSCH/PUCCH transmission may be possible. Alternatively or additionally, in the secondary cell group, the PSCell may be configured and operated as the PCell. The operation for the PCell described below may also be performed by the PSCell.

A maximum of 31 SCells may be added, and if additional radio resource provision is required, the SCell may be configured through an RRC message (e.g., dedicated signaling). The RRC message may include a physical cell ID for each cell, and may include a DL carrier frequency (absolute radio frequency channel number: ARFCN).

PDCCH/PDSCH/PUSCH transmission is possible through the SCell. The dynamic activation and deactivation procedures of the SCell is provided for battery conservation of the UE through the MAC layer.

Cross-carrier scheduling may refer to allocating at least one (e.g., PDCCH) of all L1 control channels or L2 control channels for at least one other component carrier (CC) to one component carrier (CC). A carrier indicator field (CIF) may be used to transmit data information of another CC from the PDCCH of one CC.

The resource (PDSCH, PUSCH) for data transmission of the CC or resource (PDSCH, PUSCH) for data transmission of another CC may be allocated through control information transmitted from the PDCCH of one CC.

3-bit CIF is added to a DCI format by applying cross-carrier scheduling, and the bit size is always fixed, and the DCI format size can also be fixed regardless of the location.

Figure 4:
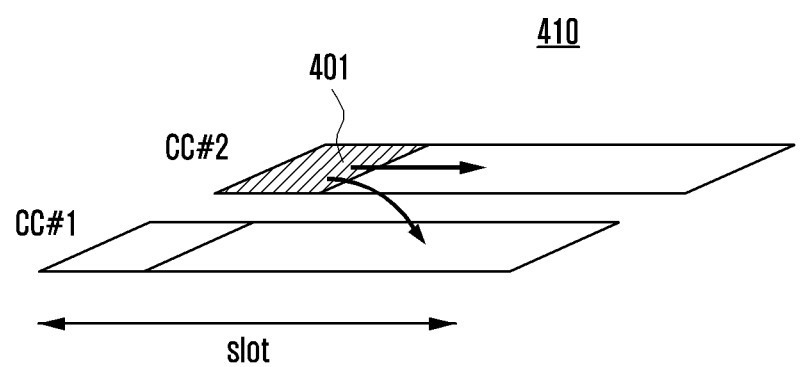
FIG. 4 illustrates an example of a cross-carrier scheduling method, according to an embodiment of the disclosure.
Figure 4:
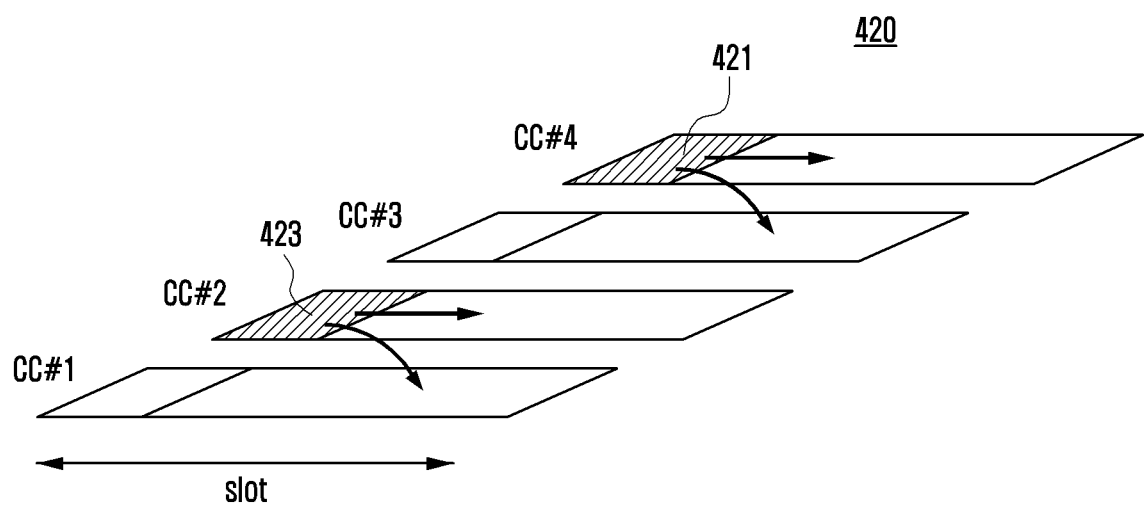

FIG. 4 illustrates an example of a cross-carrier scheduling method according to an embodiment of the disclosure.

With reference to 410 of FIG. 4, the PDSCH or PUSCH for two CCs may be scheduled from the PDCCH 401 of one CC.

Alternatively or additionally, with reference to 420 of FIG. 4, if a total of four CCs is configured, the PDSCH or PUSCH of each CC may be scheduled using the PDCCH 421, 423 of the two CCs.

Each CC may be mapped to a CI (carrier indicator) value for CIF application, which may be transmitted from the base station to the terminal through a dedicated RRC signal with UE-specific configuration.

Each PDSCH/PUSCH CC may be scheduled from one DL CC. Accordingly, the UE needs to monitor the PDCCH only in the DL CC for each PDSCH/PUSCH CC. The terminal may monitor the PDCCH in the DL CC to obtain PUSCH scheduling information in the linked UL carrier.

Meanwhile, the DSS enables long term evolution (LTE) and new radio access technology (RAT) cells to coexist on the same carrier, so an option for a telecom operator to switch to an NR communication system while maintaining an existing LTE communication system may be provided.

As the number of NR terminals in the network increases, a lack of scheduling capacity for NR terminals may occur. Accordingly, the above-described cross-carrier scheduling may be applied to schedule the PDSCH or PUSCH of the PCell or PSCell from the PDCCH of the SCell. Hereinafter, a specific method for configuring control information using the cross carrier scheduling is proposed.

The base station may configure one or more serving cells in the terminal through ServingCellConfig included in the RRC message. The ServingCellConfig may be referred to as cell configuration information or serving cell configuration information. In this case, the serving cell may include an SpCell (PCell of MCG or SCG) or SCell of a master cell group (MCG) or a secondary cell group (SCG).

Alternatively or additionally, the RRC message may include CrossCarrierSchedulingConfig, which comprises configuration information for configuring the above-described cross-carrier scheduling.

In this case, CrossCarrierSchedulingConfig may be included in the ServingCellConfig, and the CrossCarrierSchedulingConfig may include parameters for configuring related contents if the cross-carrier scheduling is used in a corresponding cell. Table 1 shows information elements (IEs) included in the CrossCarrierSchedulingConfig.

TABLE 1

CrossCarrierSchedulingConfig IE
CrossCarrierSchedulingConfig information element

```
-- ASN1START
-- TAG-CrossCarrierSchedulingConfig-START
CrossCarrierSchedulingConfig ::=       SEQUENCE {
    schedulingCellInfo                 CHOICE {
```

TABLE 1-continued

| | | |
|---|---|---|
| own | SEQUENCE { | -- Cross |
| carrier scheduling: scheduling cell | | |
|     cif-Presence | BOOLEAN | |
|   }, | | |
|   other | SEQUENCE { | -- Cross |
| carrier scheduling: scheduled cell | | |
|     schedulingCellId | ServCellIndex, | |
|     cif-InSchedulingCell | INTEGER (1 . . 7) | |
|   } | | |
| }, | | |
| . . . | | |
| } | | |
| -- TAG-CrossCarrierSchedulingConfig-STOP | | |
| -- ASN1STOP | | |

CrossCarrierSchedulingConfig field descriptions cif-Presence
The field is used to indicate whether carrier indicator field is present (value true) or not (value false) in PDCCH DCI formats, see TS 38.213 [13] If cif-Presence is set to true, the CIF value indicating a grant or assignment for this cell is 0.
cif-InSchedufingCell
The field indicates the CIF value used in the scheduling cell to indicate a grant or assignment applicable for this cell, see TS 38.213 [13].
other
Parameters for cross-carrier scheduling, i.e., a serving cell is scheduled by a PDCCH on another (scheduling) cell. The network configures this field only for SCells.
own
Parameters for self-scheduling. i.e., a serving cell is scheduled by its own PDCCH.
schedulingCellId
Indicates which cell signals the downlink allocations and uplink grants, if applicable, for the concerned SCell. In case the UE is configured with DC, the scheduling cell is part of the same cell group (i.e. MCG or SCG) as the scheduled cell.

With reference to the configuration information, if a cell in which the CrossCarrierSchedulingConfig is configured is configured as a scheduling cell, the base station may include the information of own part in the configuration information and transmit it to the terminal. If a cell in which the CrossCarrierSchedulingConfig is configured is configured as the scheduled cell, the base station may include information of other part in the configuration information and transmit it to the terminal.

If the cell in which the CrossCarrierSchedulingConfig is configured is configured as the scheduling cell, it may be determined whether or not the carrier indicator field is included in a downlink control information (DCI) according to the cif-Presence value included in the configuration information. Alternatively or additionally, if 'cif-Presence' is configured as True, the CIF value of the corresponding cell may have '0'.

Meanwhile, if a cell in which the CrossCarrierSchedulingConfig is configured is configured as the scheduled cell, the configuration information may include a serving cell index (ServCellIndex) of a cell scheduling the corresponding cell and a CIF value of the corresponding cell.

FIG. 5 illustrates a method for performing cross-carrier scheduling through an SCell according to an embodiment of the disclosure.

The serving cell may be configured for UE 1 501 and UE 2 502, respectively, and the CrossCarrierSchedulingConfig may be included in the configuration information for configuring the serving cell.

In this case, FIG. 5 illustrates a case in which the CIF value of the CrossCarrierSchedulingConfig included in the SCell configuration information for the terminal 1 501 and the terminal 2 502 is configured as True.

For example, for the UE 1 501, DSS Carrier is configured as PCell, NR Carrier1 and NR Carrier2 are configured as SCell1 and SCell2, and the cif-Presence included in the CrossCarrierSchedulingConfig of the SCell1 is configured as True.

Alternatively or additionally, for the UE 2 502, the DSS Carrier is configured as the PCell, the NR Carrier1 and the NR Carrier2 are configured as the SCell1 and the SCell2, and the cif-Presence included in the CrossCarrierSchedulingConfig of the SCell1 and the SCell2 is configured as True.

Accordingly, according to Table 1 above, the CIF of the SCell1 and the SCell2 configured in the UE 2 502 may be zero. That is, if the cif-Presence included in the configuration information of a plurality of SCells (e.g., a plurality of SCells existing in one cell group) is configured as True as in the UE 2 502, a problem in which the plurality of serving cells has the same CIF value of 0 may occur.

Alternatively or additionally, according to Table 1, the CIF of the SCell1 configured in the UE 1 501 may be 0. If the cif-Presence included in the CrossCarrierSchedulingConfig of the PCell is configured as True, the CIF of the PCell may also become 0, and a problem in which two cells have the same CIF value of 0 may occur.

Alternatively or additionally, if the cif-Presence included in the CrossCarrierSchedulingConfig of the PCell is configured as False, there is a problem that the CIF value of the PCell cannot be configured. That is, if the DCI for scheduling the PDSCH or PUSCH of the PCell is to be transmitted through the SCell1, there is a problem in that it is impossible to determine which value should be assigned to the CIF included in the DCI. Therefore, a method for solving this will be described below.

FIG. 6 illustrates a method for configuring a CIF value of a scheduling cell according to an embodiment of the disclosure.

According to an embodiment of the disclosure, a parameter for designating a CIF value may be added to a higher layer signal (e.g., RRC signaling). For example, if a cell is configured as a scheduling cell through the CrossCarrierSchedulingConfig in ServingCellConfig, a parameter designating a CIF value may be added. Table 2 shows the embodiment.

Accordingly, the terminal may monitor the PDCCH in one or more cells configured as the scheduling cell through the CrossCarrierSchedulingConfig in the ServingCellConfig. The terminal may monitor the PDCCH in one or more cells configured as the scheduling cell through CrossCarrier-

TABLE 2

New CrossCarrierSchedulingConfig IE
CrossCarrierSchedulingConfig information element

```
-- ASN1START
-- TAG-CrossCarrierSchedulingConfig-START
CrossCarrierSchedulingConfig ::=     SEQUENCE {
    schedulingCellInfo               CHOICE {
        own                          SEQUENCE {   -- Cross carrier scheduling: scheduling cell
            cif-Presence             BOOLEAN
            cif-InSchedulingCell     INTEGER (0 .. 7)
        },
        other                        SEQUENCE {   -- Cross carrier scheduling: scheduled cell
            schedulingCellId         ServCellIndex,
            cif-InSchedulingCell     INTEGER (1 .. 7)
        }
    },
    ...
}
-- TAG-CrossCarrierSchedulingConfig-STOP
-- ASN1STOP
```

CrossCarrierSchedulingConfig field descriptions cif-Presence
The field is used to indicate whether carrier indicator field is present (value true) or not (value false) in PDCCH DCI formats, see TS 38.213[13]. If cif-Presence is set to true, the CIF value indicating a grant or assignment for this cell is 0.
cif-InSchedulingCell
The field indicates the CIF value used in the scheduling cell to indicate a grant or assignment applicable for this cell, see TS 38.213 [13].
other
Parameters for cross-carrier scheduling, i.e , a serving cell is scheduled by a PDCCH on another (scheduling) cell. The network configures this field only for SCells.
own
Parameters for self-scheduling, i.e. a serving cell is scheduled by its own PDCCH.
schedulingCellId
Indicates which cell signals the downlink allocations and uplink grants, if applicable, for the concerned SCell. In case the UE is configured with DC, the scheduling cell is part of the same cell group (i.e. MCG or SCG) as the scheduled cell.

With reference to Table 2, the CIF value (cif-InSchedulingCell) of the corresponding cell may be added to the own field of CrossCarrierSchedulingConfig included in the RRC signaling. Therefore, even if the corresponding cell is configured as the scheduling cell through CrossCarrierSchedulingConfig, the CIF value may be configured, so that the base station may configure a different CIF value for each cell. In this case, the value of the parameter may have a value of '0 to $2^{(CIF\_bitwidth\ in\ DCI)}-1$'. The CIF_bitwidth in the DCI may be configured by the base station or may be determined based on a preset value.

For example, for UE 2 602, the base station may configure a parameter such that the CIFs of SCell1 and SCell2 have cifN2 and cifN1 (e.g., where cifN1 values are not equal to cifN2 values), respectively.

Alternatively or additionally, for UE 1 601, even if the cif-Presence included in the CrossCarrierSchedulingConfig of PCell is configured as False, the CIF value is configured through the added parameter (assigning a CIF value other than the CIF value assigned to the cells configured in the UE 1).

SchedulingConfig in ServingCellConfig and in which the cif-Presence is configured as True, and may receive by decoding the DCI including a CIF field.

Alternatively or additionally, the terminal may receive a PDSCH or transmit a PUSCH through the serving cells configured as the scheduled cell through the CrossCarrierSchedulingConfig in the ServingCellConfig. One or more scheduling cells for scheduling the PDSCH or PUSCH of the serving cell may be configured in the terminal, and the ServCellIndex of the one or more scheduling cells may be included in the CrossCarrierSchedulingConfig.

According to another embodiment, a parameter indicating a CIF value may be added to a higher layer signal (e.g., RRC signaling). That is, a parameter indicating a CIF value may be added to the CrossCarrierSchedulingConfig so that the CIF value can be configured even if the SCell is configured as the scheduling cell through the CrossCarrierSchedulingConfig in the ServingCellConfig that configures the SCell. In this case, the value of the parameter may have a value of '1 to $2^{(CIF\_bitwidth\ in\ DCI)}-1$' The CIF_bitwidth in the DCI may be configured by the base station or may be determined based on a preset value.

Table 3 illustrates the above embodiment.

TABLE 3

New CrossCarrierSchedulingConfig IE
CrossCarrierSchedulingConfig information element

```
-- ASN1START
-- TAG-CrossCarrierSchedulingConfig-START
CrossCarrierSchedulingConfig ::=    SEQUENCE {
    schedulingCellInfo                  CHOICE {
        own                                 SEQUENCE {    -- Cross
carrier scheduling: scheduling cell
            cif-Presence                        BOOLEAN
            cif-InSchedulingCell                INTEGER (1 .. 7)
        },
        other                               SEQUENCE {    -- Cross
carrier scheduling: scheduled cell
            schedulingCellId                    ServCellIndex,
            cif-InSchedulingCell                INTEGER (1 .. 7)
        }
    },
    ...
}
-- TAG-CrossCarrierSchedulingConfig-STOP
-- ASN1STOP
```

CrossCarrierSchedulingConfig field descriptions cif-Presence
The field is used to indicate whether carrier indicator field is present (value true) or not (value false) in PDCCH DCI formats, see TS 38.213[13]. If cif-Presence is set to true, the CIF value indicating a grant or assignment for this cell is 0.
cif-InSchedulingCell
The field indicates the CIF value used in the scheduling cell to indicate a grant or assignment applicable for this cell, see TS 38.213 [13].
other
Parameters for cross-carrier scheduling, i.e , a serving cell is scheduled by a PDCCH on another (scheduling) cell. The network configures this field only for SCells.
own
Parameters for self-scheduling, i.e. a serving cell is scheduled by its own PDCCH.
schedulingCellId
Indicates which cell signals the downlink allocations and uplink grants, if applicable, for the concerned SCell. In case the UE is configured with DC, the scheduling cell is part of the same cell group (i.e. MCG or SCG) as the scheduled cell.

According to this embodiment, if the PCell is configured as the scheduling cell through the CrossCarrierSchedulingConfig in the ServingCellConfig that configures the PCell, a parameter indicating the CIF value is not added, and in this case, the base station and the terminal understand that the CIF value of the PCell is 0. For example, the CIF value of the PCell may be configured to a predetermined value (e.g., 0), and may be preset to the terminal and the base station.

The terminal may monitor the PDCCH in one or more cells configured as the scheduling cell through the CrossCarrierSchedulingConfig in the ServingCellConfig. The terminal may monitor the PDCCH in one or more cells configured as the scheduling cell through the CrossCarrierSchedulingConfig in the ServingCellConfig and in which the cif-Presence is configured as True, and may receive by decoding the DCI including the CIF field.

Alternatively or additionally, the terminal may receive the PDSCH or transmit the PUSCH through the serving cells configured as the scheduled cell through CrossCarrierSchedulingConfig in the ServingCellConfig. One or more scheduling cells for scheduling the PDSCH or PUSCH of the serving cell may be configured in the terminal, and the ServCellIndex(es) of the one or more scheduling cells may be included in the CrossCarrierSchedulingConfig.

Meanwhile, with reference to FIG. 6, if the CrossCarrierSchedulingConfig is not configured in the PCell of the UE 1 601 or the CrossCarrierSchedulingConfig is not configured in the PCell of the UE 2 602, the CIF value of the PCell may not be indicated. Therefore, if the DCI for scheduling the PDSCH or PUSCH of the PCell is to be transmitted through the SCell or the SCell2, it may not determine which value to configure for the CIF included in the DCI. Therefore, below, a method of configuring the CIF if the CrossCarrierSchedulingConfig is not configured in the PCell is provided.

According to an embodiment of the disclosure, if the CrossCarrierSchedulingConfig is configured in the SCell, the CIF value of the PCell may be understood by the base station and the terminal as 0 in this case. For example, the CIF value of the PCell may be configured as a predetermined value (e.g., 0), and may be preset to the terminal and the base station.

Alternatively or additionally, according to an embodiment of the disclosure, if the CrossCarrierSchedulingConfig is configured in the SCell, the terminal may not expect that the CrossCarrierSchedulingConfig is not configured in the PCell. Alternatively or additionally, the CrossCarrierSchedulingConfig configured in the PCell may include a parameter indicating the CIF value of the PCell.

Alternatively or additionally, according to an embodiment of the disclosure, a parameter indicating a CIF value may be added to a higher layer signal (e.g., RRC signaling). According to one embodiment, a parameter indicating a CIF value may be included in the ServingCellConfig. Accordingly, according to the present embodiment, a parameter designating the CIF value of the PCell may be included in the ServingCellConfig of the PCell.

Alternatively or additionally, according to an embodiment of the disclosure, a parameter indicating the CIF value of the PCell may be included in the CrossCarrierSchedulingConfig in the ServingCellConfig of the SCell for scheduling the PDSCH or PUSCH of the PCell.

Alternatively or additionally, according to an embodiment of the disclosure, the terminal and the base station may understand a certain value as the CIF value of the PCell through the following rule.

As an example, the base station and the terminal may understand that the CIF value of the PCell is the lowest among values other than the CIF values indicated for serving cells in the cell group including the PCell. For example, if the CIF value of the SCell1 is configured as 0 and the CIF value of the SCell2 is configured as 2 in the terminal in which the PCell, the SCell1, and the SCell2 are configured, the base station and the terminal may understand that the value of the PCell is 1 among the remaining CIF values (1, 3, 4, 5, 6, 7).

Alternatively or additionally, according to an embodiment of the disclosure, the terminal and the base station may understand a certain value as the CIF value of the PCell through the following rule.

As an example, the base station and the terminal may understand that the CIF value of the PCell is the highest value among values other than the CIF values indicated for serving cells in the cell group including the PCell. For example, if the CIF value of the SCell1 is configured as 0 and the CIF value of SCell2 is configured as 2 in the terminal in which the PCell, the SCell1, and the SCell2 are configured, the base station and the terminal may understand that the value of the PCell is 7 among the remaining CIF values (1, 3, 4, 5, 6, 7).

According to an embodiment of the disclosure, the terminal may monitor the PDCCH by using the CIF value determined according to the above description.

Equation 1 represents a hash function used to define a terminal search space. The terminal may perform the PDCCH monitoring in the serving cells configured to perform the PDCCH monitoring by using Equation 1. The serving cells for performing the PDCCH monitoring may include the cells configured for self-carrier scheduling and the cells configured as the scheduling cell through the CrossCarrierSchedulingConfig. The cells configured as the scheduling cell through the CrossCarrierSchedulingConfig may include the PCell and the SCells, and in this case, nCI may be determined according to the embodiment described above.

Figure 7:
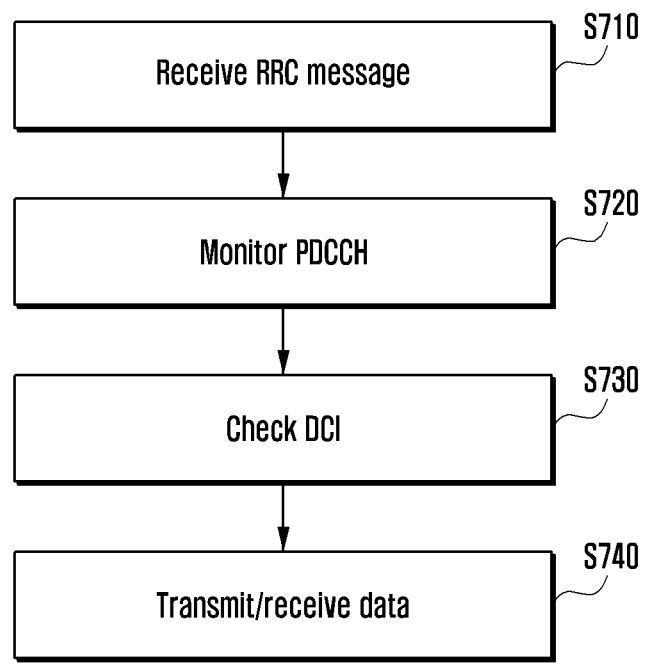
FIG. 7 illustrates a method for receiving control information in a terminal, according to an embodiment of the disclosure.

FIG. 7 illustrates a method for receiving control information in a terminal according to an embodiment of the disclosure.

With reference to FIG. 7, the terminal may receive an RRC message from the base station in the step (S710). The RRC message may include cell configuration information for the base station to configure a cell in the terminal.

The cell configuration information may include the cross-carrier scheduling configuration information.

Alternatively or additionally, the terminal may monitor the PDCCH in the cell configured based on the above configuration information in the step (S720). For example, the terminal may monitor the PDCCH of one or more cells configured as the scheduling cell in the cross-carrier configuration information. A search space for monitoring the PDCCH may be configured based on Equation 1 above. The terminal may receive a higher layer signaling (e.g., MAC CE, RRC signaling) transmitted by the base station to determine an activated cell and a deactivated cell (e.g., a cell may be configured through the RRC signaling, and the activation or deactivation of a cell may be indicated through the MAC CE), may monitor the PDCCH in the activated cell, and may not monitor the PDCCH in the deactivated cell.

The terminal may monitor the PDCCH in one or more cells in which the cif-Present field included in the cross-carrier scheduling configuration information is configured as True. In this case, if the cif-Presence field included in the cross-carrier scheduling information is configured as True, it may be used in the same way as the CIF presence field is included in the cross-carrier scheduling information. If there are two or more cells in which the cif-Presence is configured as True, the cross-carrier scheduling configuration information may further include information indicating a CIF value. However, the embodiment of the disclosure is not limited thereto, and the information indicating a CIF value may be further included in the cross-carrier scheduling configuration information regardless of the number of cells in which the cif-Presence is configured as True.

The CIF value included in the cross-carrier scheduling information may be configured to have a different value for each cell, and the CIF value may be configured to have a value of 0 to $2^{(CIF\_bitwidth\ in\ DCI)}-1$ or 1 to $2^{(CIF\_bitwidth\ in\ DCI)}-1$'. The CIF_bitwidth in the DCI may be configured by the base station or may be determined based on a preset value.

If the CIF value is configured to have a value of 1 to $2^{(CIF\_bitwidth\ in\ DCI)}-1$ a parameter indicating the CIF value

---

Equation 1 - PDCCH hashing function

For a search space set s associated with CORESET p, the CCE indexes for aggregation level L corresponding to PDCCH candidate $m_{s,n_{CI}}$ of the search space set in slot $n_{s,f}\mu$ for an active DL BWP of a serving cell corresponding to carrier indicator field value $n_{CI}$ are given by $$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i$$

where
for any CSS, $Y_{p,n_{s,f}^\mu} = 0$;
for a USS, $Y_{p,n_{s,f}^\mu} = (A_p \cdot Y_{p,n_{s,f}^\mu -1}) \bmod D$, $Y_{p,-1} = n_{RNTI} \neq 0$, $A_p = 39827$ for p mod3 = 0, $A_p = 39829$ for p mod3 = 1, $A_p = 39839$ for p mod 3 = 2, and D = 65537;
$i = 0, \ldots, L - 1$;
$N_{CCE,p}$ is the number of CCEs, numbered from 0 to $N_{CCE,p} - 1$, in CORESET p,
$n_{CI}$ is the carrier indicator field value if the UE is configured with a carrier indicator field by CrossCarrierSchedulingConfig for the serving cell on which PDCCH is monitored; otherwise, including for any CSS, $n_{CI} = 0$;

when the PCell is configured as the scheduling cell is not added, and the base station and the terminal may understand that the CIF value of the PCell is 0.

Meanwhile, if the cross-carrier scheduling configuration information is not configured in the PCell, the method for determining the CIF value of the PCell is the same as described above, and thus will be omitted below.

Alternatively or additionally, the terminal may check the DCI according to the monitoring result in the step (S730). The terminal may check the CIF value included in the DCI.

Accordingly, the terminal may receive downlink data or transmit uplink data in the step (S740). For example, the DCI may include resource allocation information for the cell configured as the scheduled cell through the cross-carrier scheduling configuration information, and the terminal may receive or transmit data based on the resource allocation information.

Figure 8:
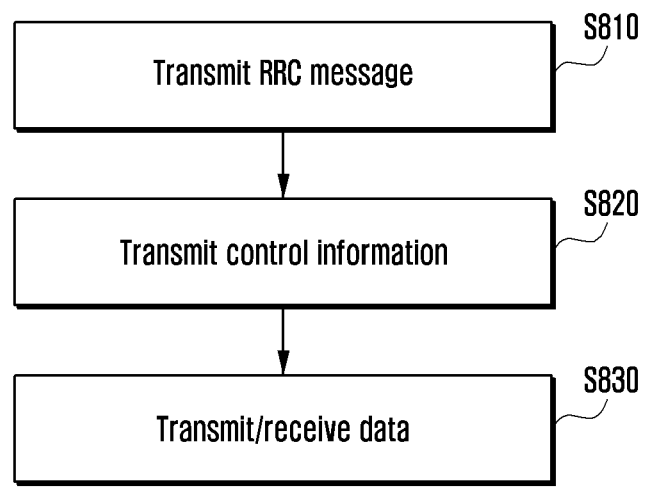
FIG. 8 illustrates a method for transmitting control information and data in a base station, according to an embodiment of the disclosure.

FIG. 8 illustrates a method for transmitting control information and data in a base station according to an embodiment of the disclosure.

With reference to FIG. 8, the base station may transmit an RRC message to the terminal in the step (S810). The RRC message may include cell configuration information for the base station to configure a cell in the terminal.

The cell configuration information may include the cross-carrier scheduling configuration information.

Alternatively or additionally, the base station may transmit the higher layer signaling (e.g., MAC CE) to activate or deactivate the serving cell configured in the terminal. The base station may transmit the control information only in an activated cell, and may not transmit the control information in a deactivated cell.

The base station may transmit the control information in the cell configured based on the configuration information in the step (S820).

The base station may transmit the control information in one or more cells in which the cif-Present field included in the cross-carrier scheduling configuration information is configured as True. In this case, if the cif-Presence field included in the cross-carrier scheduling information is configured as True, it can be used in the same way as the CIF presence field is included in the cross-carrier scheduling information. If there are two or more cells in which the cif-Presence is configured as True, the cross-carrier scheduling configuration information may further include the information indicating a CIF value. However, the embodiment of the disclosure is not limited thereto, and the cross-carrier scheduling configuration information may further include the information indicating a CIF value regardless of the number of cells in which the cif-Presence is configured as True.

The CIF value included in the cross-carrier scheduling information may be configured to have a different value for each cell, and the CIF value may be configured to have a value of 0 to $2^{(CIF\_bitwidth\ in\ DCI)}-1$ or 1 to $2^{(CIF\_bitwidth\ in\ DCI)}-1$. The CIF_bitwidth in the DCI may be configured by the base station or may be determined based on a preset value.

If the CIF value is configured to have a value of 1 to $2^{(CIF\_bitwidth\ in\ DCI)}-1$, a parameter indicating the CIF value when the PCell is configured as the scheduling cell is not added, and the base station and the terminal may understand that the CIF value of the PCell is 0.

Meanwhile, in the case that the cross-carrier scheduling configuration information is not configured in the PCell, the method for determining the CIF value of the PCell is the same as described above, and thus will be omitted below.

Accordingly, the base station may transmit downlink data or receive uplink data in the step (S830). For example, the control information may include a CIF value, and the value may indicate a cell for cross-carrier scheduling. Alternatively or additionally, the control information may include resource allocation information for the cell. Accordingly, the base station may receive or transmit data in the corresponding cell based on the resource allocation information.

Meanwhile, as described above, the own field of the cross-carrier scheduling configuration information may further include the information indicating the CIF value in addition to the cif-Presence, and the CIF value included in the control information may indicate the CIF value of the cell from which the scheduling information is transmitted. In this case, the terminal may transmit/receive data through the cell that has received the control information (e.g., self-scheduling).

Figure 9:
FIG. 9 illustrates a structure of a terminal, according to an embodiment of the disclosure.

FIG. 9 illustrates a structure of a terminal according to an embodiment of the disclosure.

With reference to FIG. 9, the terminal may include a transceiver 910, a controller 920, and a memory 930. In the disclosure, the controller may be defined as a circuit or an application-specific integrated circuit or at least one processor.

The transceiver 910 may transmit/receive signals to and from other network entities. The transceiver 910 may receive, for example, the configuration information for cross-carrier scheduling from the base station. Alternatively or additionally, the transceiver 910 may receive control information from the base station.

The controller 920 may control the overall operation of the terminal according to the embodiment proposed in the disclosure. For example, the controller 920 may control a signal flow between the respective blocks to perform operations according to the above-described flowchart. For example, the controller 920 may control the operation proposed in the disclosure based on the control information received through the cross-carrier scheduling according to an embodiment of the disclosure. The cross-carrier scheduling configuration information may be configured for each cell, and if there are two or more cells in which the cif-Presence included in the cross-carrier scheduling is configured as True (or if the CIF presence field is included in the cross-carrier scheduling configuration information, or there are two or more cells in which the CIF presence field is configured), the cross-carrier scheduling configuration information may further include the information indicating a CIF value.

The memory 930 may store at least one of information transmitted and received through the transceiver 910 and the information generated through the controller 920.

Figure 10:
FIG. 10 illustrates a structure of a base station, according to an embodiment of the disclosure.

FIG. 10 illustrates a structure of a base station according to an embodiment of the disclosure.

With reference to FIG. 10, the terminal may include a transceiver 1010, a controller 1020, and a memory 1030. In the disclosure, the controller may be defined as a circuit or an application-specific integrated circuit or at least one processor.

The transceiver 1010 may transmit/receive signals to and from other network entities. The transceiver 1010 may transmit, for example, the configuration information for the cross-carrier scheduling to the terminal. Alternatively or additionally, the transceiver 1010 may transmit a downlink control signal to the terminal.

The controller 1020 may control the overall operation of the base station according to the embodiment proposed in the disclosure. For example, the controller 1020 may control a signal flow between the respective blocks to perform operations according to the above-described flowchart. For example, the controller 1020 may control the operation proposed by the disclosure based on the control information received through the cross-carrier scheduling according to an embodiment of the disclosure. The cross-carrier scheduling configuration information may be configured for each cell, and if there are two or more cells in which the cif-Presence included in the cross-carrier scheduling is configured as True (or if the CIF presence field is included in the cross-carrier scheduling configuration information, or there are two or more cells in which the CIF presence field is configured), the cross-carrier scheduling configuration information may further include the information indicating a CIF value.

The memory 1030 may store at least one of the information transmitted and received through the transceiver 1010 and the information generated through the controller 1020.

Accordingly, according to various embodiments of the disclosure, a method performed by a terminal in a wireless communication system includes receiving the cross-carrier scheduling configuration information; identifying whether the carrier indicator field (CIF) presence field is included in the configuration information for the secondary cell (SCell); receiving downlink control information for another cell through the SCell if the CIF presence field is included; and receiving data through the other cell based on the downlink control information. If there are two or more cells including the CIF presence field, the configuration information further includes the information indicating the CIF value of the SCell.

Alternatively or additionally, according to various embodiments of the disclosure, a method performed by a base station in a wireless communication system includes transmitting the cross-carrier scheduling configuration information; transmitting downlink control information for another cell through the SCell if the configuration information for the secondary cell (SCell) includes the carrier indicator field (CIF) presence field; and transmitting data through the other cell based on the downlink control information. If there are two or more cells including the CIF presence field, the configuration information further includes the information indicating the CIF value of the SCell.

Alternatively or additionally, according to various embodiments of the disclosure, a terminal in a wireless communication system includes a transceiver; and a controller that receives the cross-carrier scheduling configuration information through the transceiver, identifies whether the carrier indicator field (CIF) presence filed is included in the configuration information for the secondary cell (SCell), receives downlink control information of another cell through the SCell if the CIF presence field is included through the transceiver, and receives data through the other cell based on the downlink control information. If there are two or more cells including the CIF presence field, the configuration information further includes the information indicating the CIF value of the SCell.

Alternatively or additionally, according to various embodiments of the disclosure, a base station in a wireless communication system includes a transceiver; and a controller that transmits the cross-carrier scheduling configuration information through the transceiver, transmits downlink control information for another cell through the SCell if the carrier indicator field (CIF) presence field is included in the configuration information for the secondary cell (SCell), and transmits data through the other cell based on the downlink control information. If two or more cells including the CIF presence field are included, the configuration information further includes the information indicating the CIF value of the SCell.

In the drawings illustrating the method of the embodiments of the disclosure, the order of description does not necessarily correspond to the order of execution, and the order relationship may be changed or executed in parallel.

Alternatively or additionally, in the drawings illustrating the method of embodiments of the disclosure, some elements may be omitted and only some elements may be included therein without departing from the essential spirit and scope of the present disclosure.

Further, in the method of embodiments of the disclosure, some or all of the contents of each embodiment may be combined without departing from the essential spirit and scope of the disclosure.

What is claimed is:

1. A method performed by a terminal in a wireless communication system, the method comprising:
   receiving, from a base station, a radio resource control (RRC) message including at least one configuration information, wherein each of the at least one configuration information is for each of at least one secondary cell (SCell), and includes cross-carrier scheduling configuration information;
   receiving, on a specific SCell of the at least one SCell, downlink control information for a cell other than the specific SCell, wherein cross-carrier scheduling configuration information for the specific SCell comprises an own field including a carrier indicator field (CIF) presence field; and
   receiving, on the cell other than the specific SCell, data based on the downlink control information,
   wherein the own field of the cross-carrier scheduling configuration information for the specific SCell further includes a CIF value field for the specific SCell in case that the CIF presence field is configured for two or more SCells including the specific SCell.

2. The method of claim 1, wherein a value corresponding to the CIF value field for the specific SCell is configured to be an integer including 0.

3. The method of claim 1, wherein a value corresponding to the CIF value field for each cell is configured differently for all cells configured for the terminal, and
   wherein the value corresponding to the CIF value field for the specific SCell is used for receiving downlink control information and data, for the specific SCell.

4. The method of claim 1, wherein in case that cross-carrier scheduling configuration information for a primary cell (PCell) is not received, a value corresponding to a CIF value field for the PCell is configured as a predetermined value, or the value corresponding to the CIF value field for the PCell is determined based on a predetermined rule.

5. A method performed by a base station in a wireless communication system, the method comprising:
   transmitting, to a terminal, a radio resource control (RRC) message including at least one configuration information, wherein each of the at least one configuration information is for each of at least one secondary cell (SCell) and includes cross-carrier scheduling configuration information;
   transmitting, to the terminal on a specific SCell of the at least one SCell, downlink control information for a cell other than the specific SCell, wherein cross-carrier scheduling configuration information for the specific SCell comprises an own field including a carrier indicator field (CIF) presence field; and transmitting, to the terminal on the cell other than the specific SCell, data based on the downlink control information, wherein the own field of the cross-carrier scheduling configuration information for the specific SCell further includes a CIF value field for the specific SCell in case that the CIF presence field is configured for two or more SCells including the specific SCell.

6. The method of claim 5, wherein a value corresponding to the CIF value field for the specific SCell is configured to be an integer including 0.

7. The method of claim 5, wherein a value corresponding to the CIF value field for each cell is configured differently for all cells configured for the terminal, and wherein the value corresponding to the CIF value field for the specific SCell is used for transmitting downlink control information and data, for the specific SCell.

8. The method of claim 5, wherein in case that cross-carrier scheduling configuration information for a primary cell (PCell) is not configured, a value corresponding to a CIF value field for the PCell is configured as a predetermined value, or the value corresponding to the CIF value field for the PCell is determined based on a predetermined rule.

9. A terminal of a in a wireless communication system, the terminal comprising:
  a transceiver;
  a memory storing one or more instructions; and
  a processor communicatively coupled to the transceiver and the memory, and configured to execute the one or more instructions stored in the memory to:
    receive, via the transceiver from a base station, a radio resource control (RRC) message including at least one configuration information, wherein each of the at least one configuration information is for each of at least one secondary cell (SCell), and includes cross carrier scheduling configuration information;
    receive, on a specific SCell of the at least one SCell, downlink control information for a cell other than the specific SCell, wherein cross-carrier scheduling configuration information for the specific SCell comprises an own field including a carrier indicator field (CIF) presence field; and
    receive, on the cell other than the specific SCell, data based on the downlink control information,
  wherein the own field of the cross-carrier scheduling configuration information for the specific SCell further includes a CIF value field for the specific SCell in case that the CIF presence field is configured for two or more SCells including the specific SCell.

10. The terminal of claim 9, wherein a value corresponding to the CIF value field for each cell is configured differently for all cells configured for the terminal, and wherein the value corresponding to the CIF value field for the specific SCell is used for receiving downlink control information and data, for the specific SCell.

11. The terminal of claim 9, wherein in case that cross-carrier scheduling configuration information for a primary cell (PCell) is not received, a value corresponding to a CIF value field for the PCell is configured as a predetermined value, or the value corresponding to the CIF value field for the PCell is determined based on a predetermined rule.

12. The terminal of claim 9, wherein a value corresponding to the CIF value field for the specific SCell is configured to be an integer including 0.

13. A base station in a wireless communication system, the base station comprising:
  a transceiver;
  a memory storing one or more instructions; and
  a processor communicatively coupled to the transceiver and the memory, and configured to execute the one or more instructions stored in the memory to:
    transmit, via the transceiver to a terminal, a radio resource control (RRC) message including at least one configuration information, wherein each of the at least one configuration information is for each of at least one secondary cell (SCell) and includes cross-carrier scheduling configuration information;
    transmit, via the transceiver to the terminal on a specific SCell of the at least one SCell, downlink control information for cell other than the specific SCell, wherein cross-carrier scheduling configuration information for the specific SCell comprises an own field including a carrier indicator field (CIF) presence field; and
    transmit, via the transceiver to the terminal on the cell other than the specific SCell, data based on the downlink control information,
  wherein the own field of the cross-carrier scheduling configuration information for the specific SCell further includes a CIF value field for the specific SCell in case that the CIF presence field is configured for two or more SCells including the specific SCell.

14. The base station of claim 13, wherein a value corresponding to the CIF value field for each cell is configured differently for all cells not configured for the terminal, and wherein the value corresponding to the CIF value field for the specific SCell is used for transmitting downlink control information and data, for the specific SCell.

15. The base station of claim 13, wherein in case that cross-carrier scheduling configuration information for a primary cell is not configured, a value corresponding to a CIF value field for the PCell is configured as a predetermined value, or the value corresponding to the CIF value field for the PCell is determined based on a predetermined rule.

16. The base station of claim 13, wherein a value corresponding to the CIF value field for the specific SCell is configured to be an integer including 0.

* * * * *